United States Patent
Ichikawa et al.

(10) Patent No.: US 10,790,531 B2
(45) Date of Patent: Sep. 29, 2020

(54) COLLECTOR PLATE AND REDOX FLOW BATTERY

(71) Applicant: SHOWA DENKO K.K., Tokyo (JP)

(72) Inventors: Masatoshi Ichikawa, Chiba (JP); Keizo Iseki, Yokohama (JP); Kenzo Hanawa, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 16/466,588

(22) PCT Filed: Dec. 6, 2017

(86) PCT No.: PCT/JP2017/043789
§ 371 (c)(1),
(2) Date: Jun. 4, 2019

(87) PCT Pub. No.: WO2018/105647
PCT Pub. Date: Jun. 14, 2018

(65) Prior Publication Data
US 2019/0393534 A1 Dec. 26, 2019

(30) Foreign Application Priority Data
Dec. 6, 2016 (JP) .................................. 2016-236719

(51) Int. Cl.
*H01M 8/18* (2006.01)
*H01M 8/026* (2016.01)
(Continued)

(52) U.S. Cl.
CPC .......... *H01M 8/188* (2013.01); *H01M 8/026* (2013.01); *H01M 8/0289* (2013.01); *H01M 8/10* (2013.01)

(58) Field of Classification Search
None
See application file for complete search history.

(56) References Cited

U.S. PATENT DOCUMENTS 6,348,279 B1  2/2002  Saito et al.
6,828,055 B2  12/2004 Kearl
(Continued)

FOREIGN PATENT DOCUMENTS

CN  102299356 A  12/2011
CN  105810987 A  7/2016
(Continued)

OTHER PUBLICATIONS

Communication dated Jan. 3, 2020, from the State Intellectual Property Office of the P.R.C in application No. 201780073737.8.
(Continued)

*Primary Examiner* — Scott J. Chmielecki
(74) *Attorney, Agent, or Firm* — Sughrue Mion, PLLC (57) ABSTRACT

This collector plate includes a peripheral edge wall that surrounds a predetermined region, and is provided on at least one surface of the collector plate, in which a surface roughness (Ra) of a first surface which is an exposed surface of the peripheral edge wall on the side of one surface, which is measured along a direction perpendicular to an extension direction of the peripheral edge wall is greater than a surface roughness (Ra) of the first surface which is measured along the extension direction of the peripheral edge wall.

14 Claims, 5 Drawing Sheets

(51) Int. Cl.
  *H01M 8/0289* (2016.01)
  *H01M 8/10* (2016.01)

(56) References Cited

U.S. PATENT DOCUMENTS

| | | | |
|---|---|---|---|
| 2007/0190392 A1 | 8/2007 | Kim et al. | |
| 2009/0053571 A1 | 2/2009 | Takata et al. | |
| 2011/0223450 A1 | 9/2011 | Home et al. | |
| 2015/0263358 A1 | 9/2015 | Zaffou et al. | |
| 2016/0036091 A1* | 2/2016 | Ohtomo | H01M 10/0525 |
| | | | 429/304 |
| 2016/0093898 A1 | 3/2016 | Gould et al. | |
| 2018/0277858 A1 | 9/2018 | Fujita et al. | |
| 2019/0036155 A1* | 1/2019 | Ahn | H01M 4/02 |
| 2019/0393533 A1* | 12/2019 | Ichikawa | H01M 8/188 |
| 2019/0393534 A1* | 12/2019 | Ichikawa | H01M 8/0289 |
| 2020/0075967 A1* | 3/2020 | Ichikawa | H01M 8/18 |
| 2020/0075968 A1* | 3/2020 | Ichikawa | H01M 8/10 |

FOREIGN PATENT DOCUMENTS

| | | |
|---|---|---|
| DE | 102014109321 A1 | 1/2016 |
| JP | 02-148659 A | 6/1990 |
| JP | 11-297338 A | 10/1999 |
| JP | 2002-246035 A | 8/2002 |
| JP | 2003-157885 A | 5/2003 |
| JP | 2007-149467 A | 6/2007 |
| JP | 2015-505147 A | 2/2015 |
| JP | 2015-122231 A | 7/2015 |
| WO | 2013/095378 A1 | 6/2013 |
| WO | 2014/066130 A1 | 5/2014 |
| WO | 2014/109957 A1 | 7/2014 |

OTHER PUBLICATIONS

International Search Report of PCT/JP2017/043791 dated Jan. 16, 2018 for related U.S. Appl. No. 16/466,575.
Non-Final Office Action dated Mar. 18, 2020 for related U.S. Appl. No. 16/466,575.
Non-Final Office Action (corrected) dated Apr. 3, 2020 for related U.S. Appl. No. 16/466,575.
International Search Report for PCT/JP2017/043789 dated Jan. 16, 2018 (PCT/ISA/210).
Communication dated Jun. 30, 2020 from European Patent Office in EP Application No. 17878844.4.
Communication dated Jun. 30, 2020 from European Patent Office in EP Application No. 17877715.7.

* cited by examiner

COLLECTOR PLATE AND REDOX FLOW BATTERY

CROSS REFERENCE TO RELATED APPLICATIONS

This application is a National Stage of International Application No. PCT/JP2017/043789 filed Dec. 6, 2017, claiming priority based on Japanese Patent Application No. 2016-236719 filed Dec. 6, 2016, the content of which is incorporated herein by reference.

TECHNICAL FIELD

The present invention relates to a collector plate and a redox flow battery.

BACKGROUND ART

A redox flow battery is known as a high-capacity storage battery. Typically, the redox flow battery includes an ion-exchange membrane that separates an electrolyte, and electrodes that are provided on both sides of the ion-exchange membrane. An oxidation reaction and a reduction reaction simultaneously progress on the electrodes, and thus, the redox flow battery is charged and discharged.

In the redox flow battery, the electrode is stored in an electrode compartment. The redox flow battery operates while the electrolyte is supplied to the electrode compartment and the electrolyte is circulated. Ions in the electrolyte give electrons to the electrodes, and the electrons are transferred to the outside of the redox flow battery. At this time, protons are transferred via the ion-exchange membrane. The redox flow battery is charged and discharged in such manner.

For example, in Patent Documents 1 and 2, a flow path of an electrolyte is formed in a current collector, and thus, a decrease in internal resistance is realized.

However, in the case where a comb-shaped flow path is provided as described in Patent Documents 1 and 2, the state of electrolyte supply differs between a flow path region and a wall region formed between the flow paths.

A difference in the state of electrolyte supply in a plane (in-plane direction) of the electrode becomes a factor to increase cell resistance of the redox flow battery. The reason is that the entire surface of the electrode cannot be used to the maximum during charging and discharging. Therefore, the redox flow battery requires a configuration where the electrolyte can be uniformly supplied to the electrode in an in-plane direction.

PRIOR ART DOCUMENTS

Patent Documents

Patent Document 1: Japanese Unexamined Patent Application, First Publication No. 2015-122231
Patent Document 2: Published Japanese Translation No. 2015-505147 of the PCT International Publication

DISCLOSURE OF THE INVENTION

Problems to be Solved by the Invention

The present invention has been made in light of the problem, and an object of the present invention is to obtain a redox flow battery in which an electrolyte can be supplied to the entire surface in an in-plane direction.

Solutions for Solving the Problems

As a result of intensive study, the inventors of the present invention have found a configuration where a collector plate is provided with a peripheral edge wall surrounding a predetermined region, and an electrolyte diffuses in the region surrounded by the peripheral edge wall. The inventors have also found that it is possible to decrease a difference in the state of electrolyte supply between the vicinity of an outer periphery and a central portion of the region surrounded by the peripheral edge wall by providing a predetermined shape in a surface of the peripheral edge wall.

That is, the present invention provides a collector plate and a redox flow battery hereinbelow to solve the problem.

(1) According to one aspect of the present invention, there is provided a collector plate including a peripheral edge wall that surrounds a predetermined region, and is provided on at least one surface of the collector plate, in which a surface roughness (Ra) of a first surface which is an exposed surface of the peripheral edge wall on a side of the one surface (on the one surface side), which is measured along a direction perpendicular to an extension direction of the peripheral edge wall, is greater than a surface roughness (Ra) of the first surface which is measured along the extension direction of the peripheral edge wall.

(2) In the collector plate of the aspect, the surface roughness (Ra) of the first surface of the peripheral edge wall, which is measured along the direction perpendicular to the extension direction of the peripheral edge wall, may be in a range of 20 µm to 500 µm.

(3) In the collector plate of the aspect, protrusions and recessions may be provided in the first surface of the peripheral edge wall, and the protrusions and recessions may be formed in a direction intersecting the extension direction of the peripheral edge wall.

(4) In the collector plate of the aspect, the protrusions and recessions may be a plurality of grooves extending along the extension direction of the peripheral edge wall.

(5) In the collector plate of the aspect, a width of the groove may be in a range of 50 µm to 500 µm.

(6) In the collector plate of the aspect, a depth of the groove may be in a range of 50 µm to 500 µm.

(7) According to another aspect of the present invention, there is provided a redox flow battery including: an ion-exchange membrane; the collector plate of the aspect; and electrodes disposed between the ion-exchange membrane and the collector plate, in which the collector plate is disposed in such a manner that the first surface faces the electrode, and the peripheral edge wall forms a part of an electrode compartment through which an electrolyte flows.

(8) In the redox flow battery of the other aspect, a thickness of the electrode may be greater than or equal to five times the surface roughness (Ra) measured along the direction perpendicular to the extension direction of the peripheral edge wall.

Effects of the Invention

In the case where the collector plate of one aspect of the present invention is used in the redox flow battery, the electrolyte can diffuse to the entire surface of the electrode in an in-plane direction.

EMBODIMENTS FOR CARRYING OUT THE INVENTION

A redox flow battery will be described hereinbelow in detail with proper reference to the drawings. In the drawings referenced in the description hereinbelow, characteristic parts may be magnified for an illustrative purpose for easy understanding of characteristics of the present invention, and a dimension ratio of each configuration element may differ from an actual value. Materials and dimensions provided in the description hereinbelow are simply exemplary examples, and invention limited thereto. Modifications can be appropriately made without departing from requirements (features) of the present invention.

First Embodiment

Figure 1:
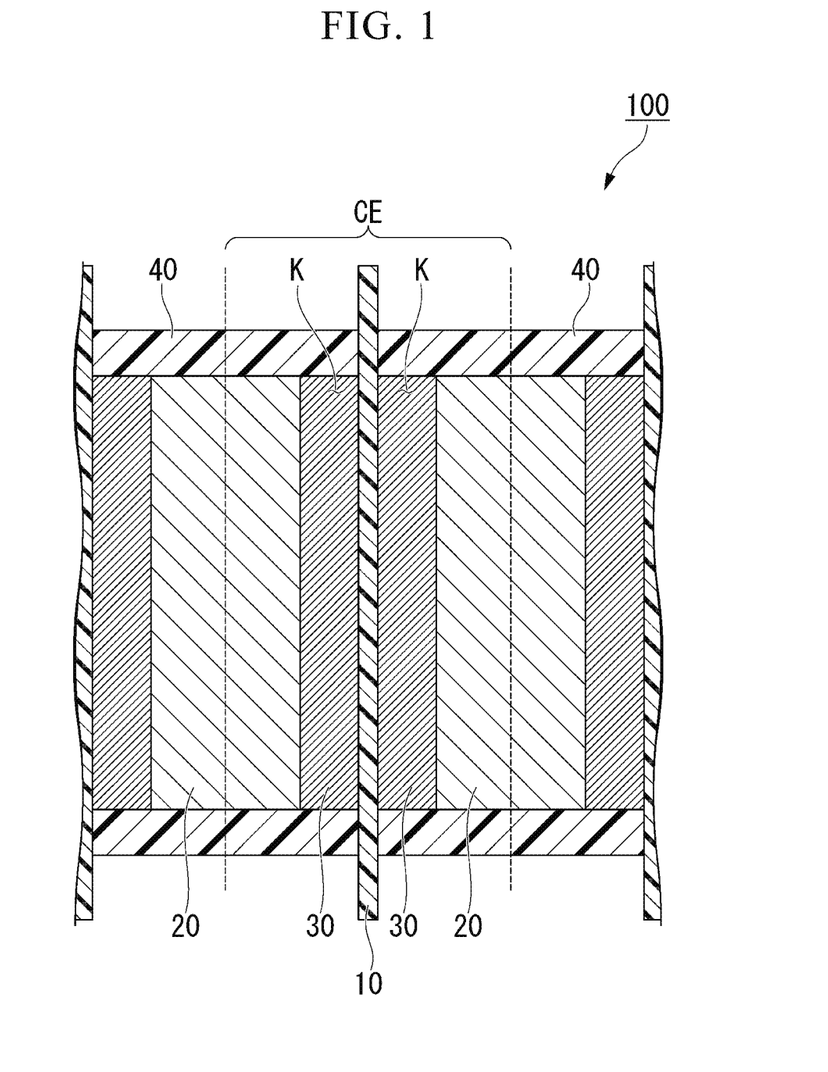
FIG. 1 is a schematic cross-sectional view of a redox flow battery of a first embodiment.

FIG. 1 is a schematic cross-sectional view of a redox flow battery of a first embodiment.

A redox flow battery 100 shown in FIG. 1 includes: an ion-exchange membrane 10; collector plates 20; and electrodes 30. The collector plates 20 and the electrodes 30 are surrounded by a cell frame 40. The electrode 30 is provided in an electrode compartment K formed by the ion-exchange membrane 10, the collector plate 20, and the cell frame 40. An electrolyte supplied to the electrode compartment K is prevented from leaking to the outside by the cell frame 40.

The redox flow battery 100 shown in FIG. 1 has a cell-stack structure where a plurality of cells CE are stacked on top of each other. The number of stacks of the cells CE can be appropriately changed depending on applications, and only a single cell may be provided. In the case where the plurality of cells CE are connected together in series, a practical voltage is obtained. One cell CE includes the ion-exchange membrane 10; two electrodes 30 servings as a positive electrode and a negative electrode between which the ion-exchange membrane 10 is interposed; and the collector plates 20 between which the two electrodes 30 are interposed.

Hereinbelow, a stacking direction of the cell-stack structure where the cells CE are stacked on top of each other may be simply referred to as a "stacking direction", and the direction of a plane vertical to the stacking direction of the cell-stack structure may be simply referred to as an "in-plane direction".

"Ion-Exchange Membrane"

A cation-exchange membrane can be preferably used as the ion-exchange membrane 10. Specifically, examples of the material of the ion-exchange membrane 10 include a perfluorocarbon polymer having a sulfo group, a hydrocarbon-based polymer compound having a sulfo group, a polymer compound doped with an inorganic acid such as phosphoric acid, an organic/inorganic hybrid polymer in which a part thereof is substituted with a proton-conductive functional group, and a proton conductor in which a polymer matrix is impregnated with a phosphoric acid solution or a sulfuric acid solution. Among the materials, a perfluorocarbon polymer having a sulfo group is preferably used, and a Nafion (registered trademark) is more preferably used.

"Collector Plate"

The collector plate 20 is a current collector having the function of transferring electrons to or from the electrode 30. In the case where both surfaces of the collector plate 20 can be used as a current collector, the collector plate 20 may be referred to as a bipolar plate. The collector plate of the embodiment is more, preferably used in a redox flow battery.

The collector plate 20 can be made from a material having conductivity. A conductive material containing carbons can be used. Specifically, examples of the material include conductive resin consisting of graphite and an organic polymer compound, conductive resin in which a part of graphite is substituted with at least one of a carbon black and a diamond-like carbon, a mold material obtained by kneading carbon and resin. Among the materials, a mold material obtained by kneading carbon and resin and molding the kneaded product is preferably used.

Figure 2:
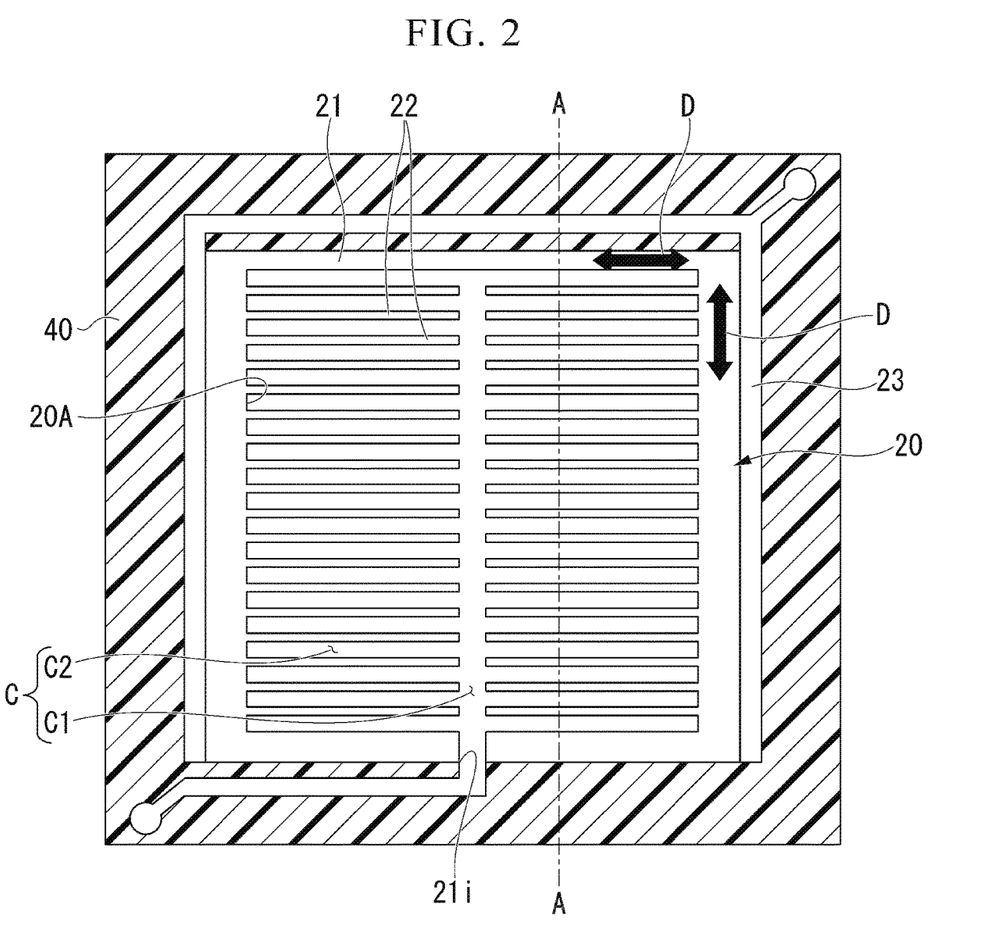
FIG. 2 is a plan view of a collector plate stored in a cell frame of the redox flow battery of the first embodiment as seen in a stacking direction.

FIG. 2 is a plan view of the collector plate 20 stored in the cell frame 40 as seen in the stacking direction.

Figure 3:
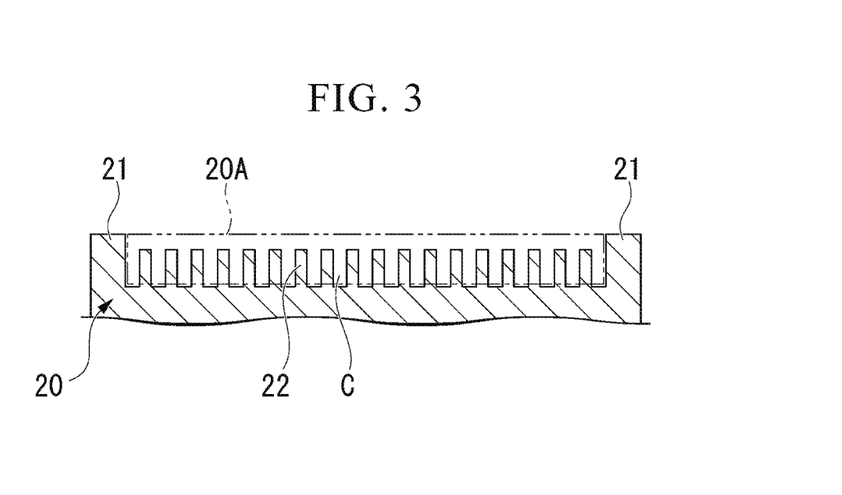
FIG. 3 is a schematic cross-sectional view of the collector plate as the redox flow battery of the first embodiment is cut along an A-A plane in FIG. 2.

A recessed region (portion) 20A is formed on a surface of the collector plate 20 positioned on the side of the ion-exchange membrane 10 (the ion-exchange membrane 10 side surface). FIG. 3 is a schematic cross-sectional view of the collector plate as the redox flow battery of the first embodiment is cut along an A-A plane in FIG. 2. As shown in FIG. 3, the recessed region 20A includes a flow path C and a region into which a first electrode 31 (will be described later) is fitted. A peripheral edge wall 21 is provided on one surface of the collector plate 20, and the peripheral edge wall 21 defines the recessed region 20A. The peripheral edge wall 21 surrounds a predetermined region containing the flow path C. The region surrounded by the peripheral edge wall 21 contains the recessed region 20A, and has an arbitrarily selected shape such as square, substantially square, or rectangle. An electrolyte is supplied from an opening portion 21*i* of the peripheral edge wall 21 into the recessed region 20A surrounded by the peripheral edge wall 21.

It is preferable that the electrolyte supplied from the opening portion 21*i* of the peripheral edge wall 21 diffuses throughout the recessed region 20A, and then is exhausted from an exhaust path 23. Because the electrolyte diffuses throughout the recessed region 20A in the in-plane direction, the entire surface of the electrode 30 in the in-plane direction can be used. As a result, the cell resistance of the redox flow battery decreases, and charge and discharge characteristics are improved.

Figure 4:
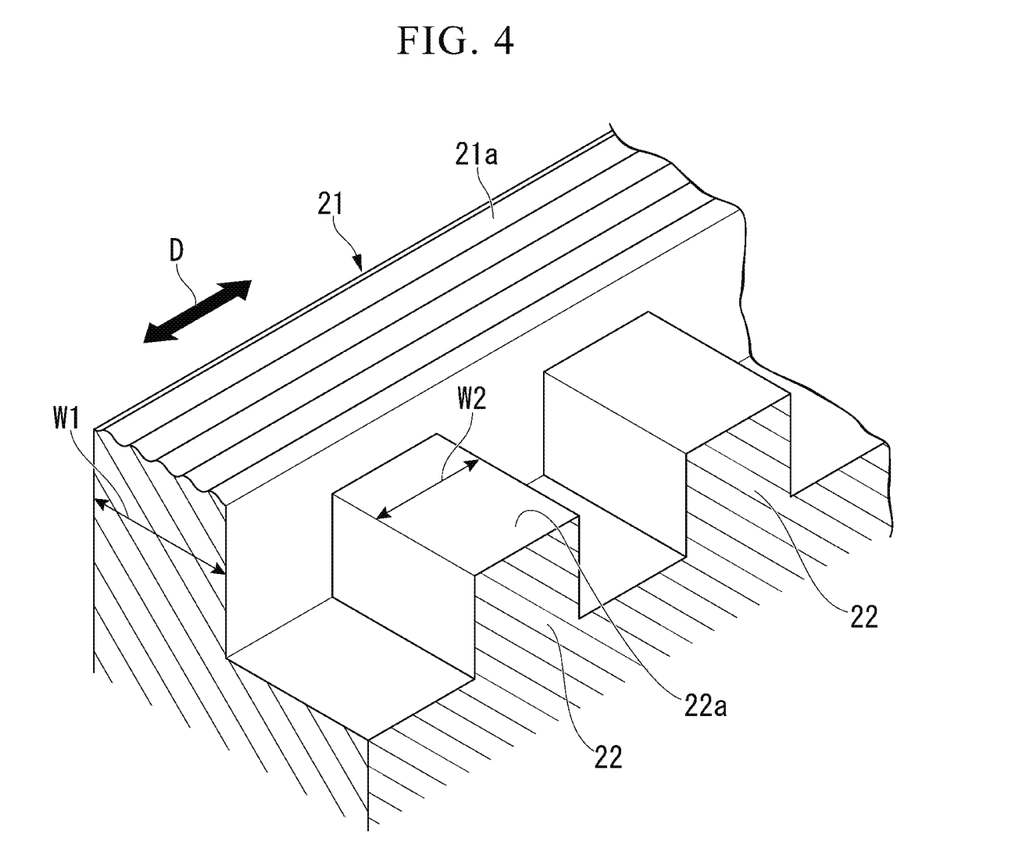
FIG. 4 is a schematic perspective magnified view of main elements of the collector plate of the redox flow battery of the first embodiment.
Figure 5:
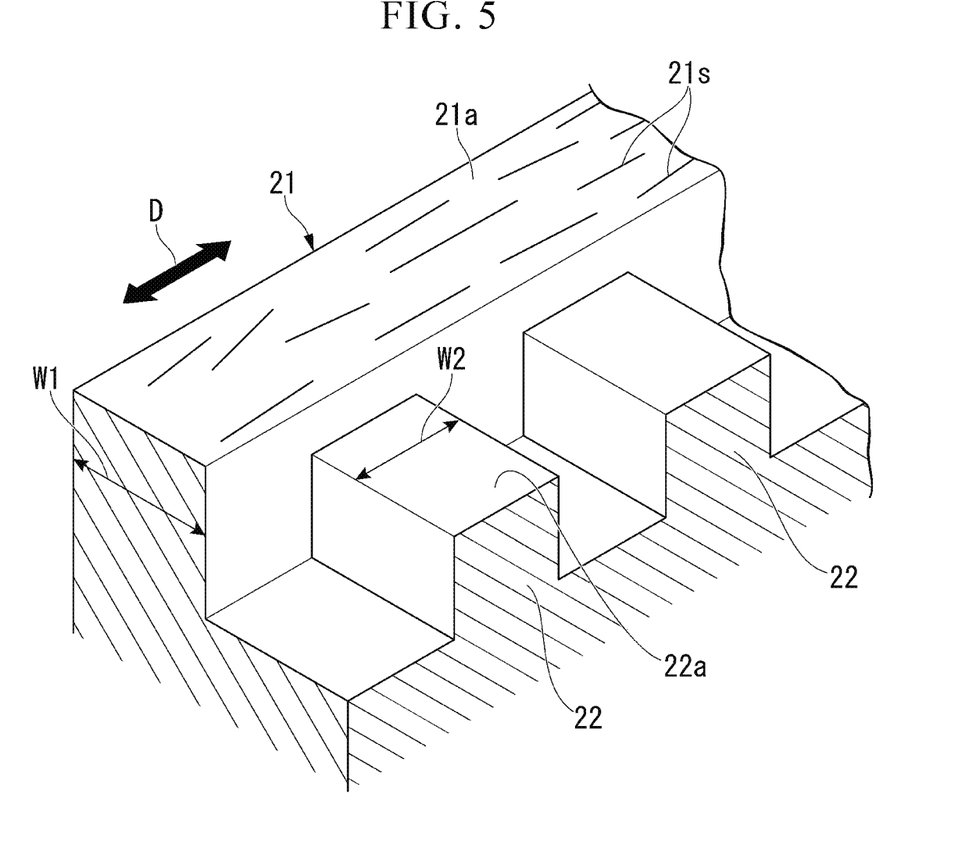
FIG. 5 is a schematic perspective magnified view of main elements in another example of the collector plate of the redox flow battery of the first embodiment.

FIG. 4 is a perspective magnified view of main elements of the collector plate 20. As shown in FIG. 4, a first surface 21*a* of the peripheral edge wall 21 is a surface disposed on the side of the ion-exchange membrane 10 (exposed surface on the side (upper side in FIG. 4) of one surface where the recessed region 20A is formed). The first surface 21*a* of the peripheral edge wall 21 is also referred to as a surface that is positioned toward the stacking direction, and faces the electrode 30 or the ion-exchange membrane 10. In FIG. 4, the first surface 21*a* of the peripheral edge wall 21 is provided with protrusions and recessions restricting a flow of the electrolyte. The protrusions and recessions are formed in a direction intersecting an extension direction D of the peripheral edge wall 21. The directions of arrows in FIGS. 2, 4, and 5 represent the extension direction D. In FIG. 4, the protrusions and recessions of the first surface 21a of the peripheral edge wall 21 are lines of protrusions and recessions.

In the case where the protrusions and recessions are cyclically formed in the first surface 21a of the peripheral edge wall 21 in the direction intersecting the extension direction D, it becomes difficult for the electrolyte to flow front the recessed region 20A to the exhaust path 23. That is, before reliably diffusing throughout the recessed region 20A, the electrolyte is restricted from passing over the first surface 21a of the peripheral edge wall 21, and flowing to the exhaust path 23. As a result, the electrolyte reliably diffuses throughout the recessed region 20A, and is supplied to the entire surface of the electrode 30 in the in-plane direction.

The first surface 21a of the peripheral edge wall 21 may not necessarily have a pattern of protrusions and recessions. The surface roughness (Ra) of the first surface 21a of the peripheral edge wall 21 which is measured along a direction perpendicular to the extension direction D of the peripheral edge wall 21 may be greater than the surface roughness (Ra) measured along the extension direction D of the peripheral edge wall 21. In the case where the condition is satisfied, the electrolyte can be restricted from flowing from the recessed region 20A to the exhaust path 23, and the electrolyte can diffuse to the entire surface of the electrode 30 in the in-plane direction.

The surface roughness is an arithmetic surface roughness measured based on JIS B0601. The arithmetic surface roughness (Ra) is also referred to as a mean surface roughness or simply a surface roughness. The measurement length of the surface roughness is set to 5 mm in the extension direction D, and is set to half a width W1 of the peripheral edge wall 21 in the direction perpendicular to the extension direction D. The surface roughness is obtained as an average value of surface roughnesses measured at any five arbitrary points.

In the case where the electrode 30 is disposed between the peripheral edge wall 21 and the ion-exchange membrane 10, the surface roughness (Ra) of the first surface 21a of the peripheral edge wall 21 which is measured along the direction perpendicular to the extension direction D of the peripheral edge wall 21 is preferably less than or equal to 20% of a thickness of the electrode 30, and greater than or equal to 5% of the thickness of the electrode 30, which will be described later. That is, the thickness of the electrode 30 is preferably greater than or equal to five times and less than or equal to 20 times the surface roughness (Ra) measured along the direction perpendicular to the extension direction D of the peripheral edge wall 21.

The thickness of the electrode 30 represents the thickness of the electrode 30 on the first surface 21a of the peripheral edge wall 21. In many cases, after the electrode 30 is assembled into the cell CE, the electrode 30 is compressed in a thickness direction. However, the thickness of the electrode 30 described herein represents a thickness before the electrode 30 is compressed (before the electrode 30 is assembled into the cell CE). In the case where a plurality of layers of electrodes are provided (refer to FIG. 6), and the layers are simply stacked on top of each other, and can be easily separated from each other, the thickness represents a thickness of a layer (second electrode 32 in FIG. 6) in contact with the peripheral edge wall 21. On the other hand, in the case where a plurality of layers are firmly fixed to each other, the thickness represents the total thickness of layers (second electrode 32 and a liquid outlet layer 33 in FIG. 6) stacked on top of each other on the peripheral edge wall 21.

In the case where the surface roughness is large relative to the thickness of the electrode 30, the entirety of the electrode 30 may undulate along the peripheral edge wall 21. In the case where the entirety of the electrode 30 undulates, a gap may be formed between the electrode 30 and another configuration element (for example, the ion-exchange membrane 10), and a bypass path may be formed through which the electrolyte flows to the exhaust path 23 via the gap instead of via the electrode 30. Because an electrolyte path, which is not via the electrode 30, makes no contribution to reaction, the cell resistance increases. For this reason, the surface roughness (Ra) is preferably less than or equal to 20% of the thickness of the electrode 30. In the case where the surface roughness is in this range, it is possible to prevent an undulation of the electrode 30.

In the case where the surface roughness is small relative to the thickness of the electrode 30, the surface roughness makes less contribution to a flow of the electrolyte. That is, the electrolyte flows between the peripheral edge wall and the electrode 30, and it becomes difficult for the electrolyte to be supplied to the entire surface of the electrode 30 in the in-plane direction. The surface roughness (Ra) is preferably greater than or equal to 5% of the thickness of the electrode 30. In the case where the surface roughness is in this range, the electrolyte can be restricted from flowing from the recessed region 20A to the exhaust path 23.

The concrete value of the surface roughness (Ra) of the first surface 21a of the peripheral edge wall 21 which is measured along the direction perpendicular to the extension direction D of the peripheral edge wall 21 is preferably in a range of 20 μm to 500 μm, and more preferably in a range of 50 μm to 300 μm.

The redox flow battery is assembled by stacking the collector plates 20, the electrodes 30, and the ion-exchange membrane 10 on top of each other which are separate members, and interposing the collector plates 20, the electrodes 30, and the ion-exchange membrane 10 between themselves in the stacking direction. For this reason, the position of the electrode 30 may shift relative to the position of the collector plate 20 in the in-plane direction. In the case where the position of the electrode 30 shifts relative to the position of the collector plate 20, the electrolyte flows out without passing through the electrode 30, and charge and discharge capacity of the redox flow battery decreases.

In the case where the first surface 21a of the peripheral edge wall 21 has a predetermined surface roughness, the positioning of the electrode 30 during the assembly of the redox flow battery becomes stable. That is, a decrease in the charge and discharge capacity of the redox flow battery is prevented.

As shown in FIG. 5, as the protrusions and recessions of the first surface 21a of the peripheral edge wall 21, a plurality of grooves 21s may be provided along the extension direction D of the peripheral edge wall 21 without being subjected to a complex process. It is possible to easily form the grooves 21s only by scratching the first surface 21a of the peripheral edge wall 21.

The length of the groove 21s is preferably greater than or equal to 0.5 mm, more preferably greater than or equal to 5 mm, and further more preferably greater than or equal to 1 cm. The length of the groove 21s is preferably less than the length of the peripheral edge wall 21 in the extension direction D.

The width of the groove 21s is preferably in a range of 50 µm to 500 µm, more preferably in a range of 100 µm to 400 µm, and further more preferably in a range of 150 µm to 300 µm. The width is preferably less than or equal to one fifth the length, and is more preferably less than or equal to tenth the length.

The depth of the groove 21s is preferably in a range of 50 µm to 500 µm, more preferably in a range of 100 µm to 400 µm, and further more preferably in a range of 150 µm to 300 µm.

The electrolyte flows on the first surface 21a of the peripheral edge wall 21 in a flow direction along the grooves 21s. Therefore, the more the length of the groove 21s is, the greater effects of restricting the electrolyte from flowing from the recessed region 20A of the collector plate 20 to the exhaust path become. In the case where the width or depth of the groove 21s is in the above-described range, the electrolyte flows more easily in the direction along the grooves.

It is possible to obtain the length, width, and depth of the groove 21s by averaging lengths, widths, and depths of twenty arbitrary grooves 21s, respectively. The protrusions and recessions are preferably formed in the direction perpendicular to the extension direction D of the peripheral edge wall 21. It is possible to form the protrusions and recessions by moving an abrasive with projections on the first surface 21a of the peripheral edge wall 21 in the extension direction D while keeping the abrasive in contact with the first surface 21a.

Internal walls 22 are provided in the recessed region 20A surrounded by the peripheral edge wall 21. The internal walls 22 are not necessarily required, but in the case where the internal walls 22 are provided, the electrolyte is easily supplied into the recessed region 20A. The internal walls 22 form the flow path C through which the electrolyte flows in an inlet portion. It is also referred that a plurality of the internal walls 22 are provided, and the flow path C is formed between the internal walls 22. The shape of the flow path C formed by the internal walls 22 is not limited to a specific shape.

The internal walls 22 shown in FIG. 2 include a first flow path C1 that is a part of the flow path C extending from the opening portion 21i in one direction, and second flow paths C2 that are connected with the first flow path C1 and branch from the first flow path C1 in a direction intersecting the first flow path C1. The supplied electrolyte flows along the first flow path C1, and diffuses in the second flow paths C2. That is, the electrolyte easily diffuses in the recessed region 20A in the in-plane direction.

The configuration of the collector plate 20 is not limited to the configuration shown in FIG. 2, and the collector plate 20 can have various configurations.

As shown in FIG. 4, a first surface 22a of the internal wall 22 is a surface in direct contact with the electrode 30. The first surface 22a of the internal wall 22 is also referred to as a surface that is positioned toward the stacking direction, and faces the electrode 30. In the embodiment, the surface roughness (Ra) of the first surface 22a of the internal wall 22 preferably is greater than or equal to 1 µm and less than or equal to 300 µm, more preferably greater than or equal to 2 µm and less than or equal to 250 µm, and further more preferably greater than or equal to 5 µm and less than or equal to 200 µm. The measurement length of the surface roughness of the internal wall 22 is set to 2 mm. The surface roughness is obtained as an average value of surface roughnesses measured at any five arbitrary points.

In the case where the first surface 22a of the internal wall 22 has a predetermined surface roughness, the contact area between the electrode 30 and the internal walls 22 is considered to become large. In the case where the contact area between the electrode 30 and the internal walls 22 is large, the transferring of electrons occurring in the electrolyte becomes smooth, and the cell resistance of the redox flow battery decreases.

In the case where the first surface 22a of the internal wall 22 has the predetermined surface roughness, the positioning of the electrode 30 during the assembly of the redox flow battery becomes more stable. That is, a decrease in the charge and discharge capacity of the redox flow battery is prevented.

The state of contact between the first surface 22a of the internal wall 22 and carbon fibers of the electrode 30 is also one of major factors for increasing a contact area between the collector plate 20 and the electrode 30.

For example, in the case where a fiber diameter of the carbon fibers of the electrode 30 is greatly large relative to the surface roughness (Ra) of the first surface 22a of the internal wall 22, the carbon fibers cannot enter the protrusions and recessions of the first surface 22a. In this case, the carbon fibers are in point contact with the protrusions and recessions of the first surface 22a.

It is preferable that the carbon fibers are in surface contact with the protrusions and recessions of the first surface 22a so as to increase the contact area between the electrode 30 and the collector plate 20. For this reason, the surface roughness (Ra) of the first surface 22a of the internal wall 22 is preferably greater than or equal to 1.0 time and less than or equal to 100 times the fiber diameter of the carbon fibers (will be described later) of the electrode 30, and more preferably greater than or equal to 1.2 times and less than or equal to 50 times the fiber diameter.

A width W2 of the internal wall 22 is preferably greater than or equal to 0.5 mm and less than or equal to 30 mm, and more preferably greater than or equal to 0.5 mm and less than or equal to 10 mm. The electrolyte is supplied along the flow path C. For this reason, when a part of the electrode 30 positioned (present) on the flow path C is compared to a part of the electrode 30 positioned on the internal wall 22, the electrolyte is easily supplied to the electrode 30 positioned on the flow path C. In the case where the width W2 of the internal wall 22 is large, it becomes difficult for the electrolyte to be supplied to the part of the electrode 30 on the internal wall 22.

Reactions in the redox flow battery occur at an interface between the electrolyte and the electrode 30. For this reason, in the case where the width of the internal wall 22 is sufficiently small, the electrolyte is sufficiently supplied in the in-plane direction, an increase in the cell resistance is prevented, and a decrease in the charge and discharge capacity of the redox flow battery is prevented.

The internal walls 22 form a flow path for a flow of the electrolyte. For this reason, it is possible to ensure sufficient strength by designing the internal wall 22 to have a certain level of thickness. As a result, there are advantages such as being easily processed.

"Electrode"

Figure 6:
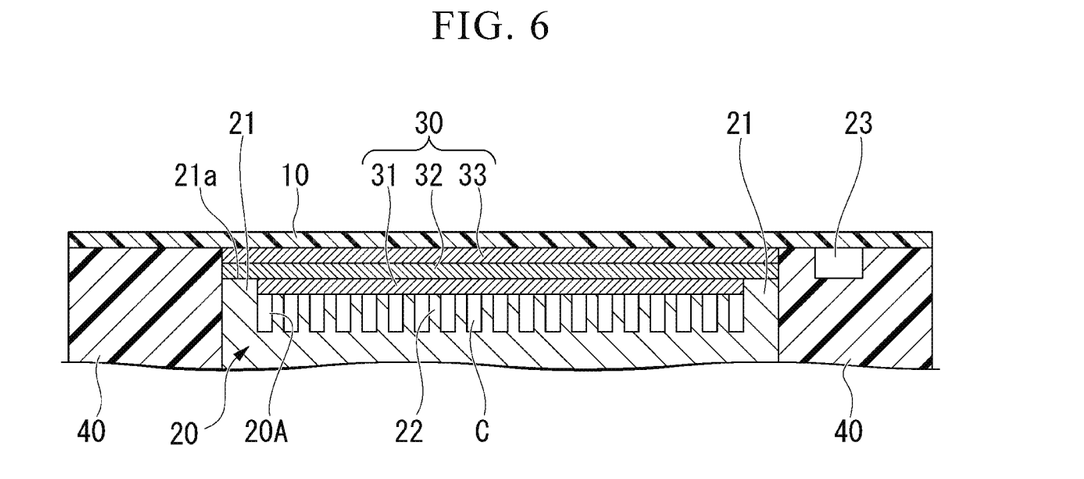
FIG. 6 is a schematic cross-sectional view as the redox flow battery of the first embodiment is cut along the A-A plane in FIG. 2.

FIG. 6 is a schematic cross-sectional view as the redox flow battery of the first embodiment is cut along the A-A plane FIG. 2.

A conductive sheet containing carbon fibers can be used as the electrode 30. The carbon fiber referred herein is fibrous carbon, and examples of the fibrous carbon include carbon fibers and carbon nanotubes. In the case where the electrode 30 contains carbon fibers, a contact area between the electrolyte and the electrode 30 increases, and reactivity of the redox flow battery 100 increases.

Particularly, in the case where the electrode 30 contains carbon nanotubes having a diameter of less than or equal to 1 μm, a fiber diameter of the carbon nanotubes is small, and thus it is possible to increase the contact area between the electrolyte and the electrode 30. On the other hand, in the case where the electrode 30 contains carbon fibers having a diameter of greater than or equal to 1 μm, the conductive sheet becomes strong, and it becomes difficult to break the conductive sheet. For example, a carbon felt, a carbon paper, or a carbon-nanotube sheet can be used as the conductive sheet containing carbon fibers.

A layer of the electrode 30 may be provided in the stacking direction, or a plurality of layers of the electrodes 30 may be provided in the stacking direction. For example, as shown in FIG. 6, the electrode 30 may include the first electrode 31, the second electrode 32, and the liquid outlet layer 33 which are sequentially disposed from the side of the collector plate 20.

The first electrode 31 is fitted into the recessed region 20A of the collector plate 20, and is present closer to the collector plate 20 than the first surface 21a of the peripheral edge wall 21. In detail, the first electrode 31 is fitted into a region which is surrounded by a side surface of the peripheral edge wall 21 and the first surfaces 22a of the internal walls 22 in the recessed region 20A. The second electrode 32 is disposed closer to the ion-exchange membrane 10 than the first surface 21a of the peripheral edge wall 21, and stretches throughout a region surrounded by the cell frame 40. The liquid outlet layer 33 stretches throughout the region surrounded by the cell frame 40, and the liquid outlet layer 33 allows the electrolyte to flow therethrough more easily than the second electrode 32. The liquid outlet layer 33 may be a porous sheet having a large number of holes for permeation of liquid, and may not necessarily have conductivity.

As described above, in terms of increasing the contact area between the collector plate 20 and the electrode 30, there is a relationship between the fiber diameter of the carbon fibers of the electrode 30 and the mean surface roughness (Ra) of the first surface 22a of the internal wall 22. In the case where a plurality of the electrodes 30 are provided, a fiber diameter of carbon fibers contained in an electrode layer which is in contact with the internal wall 22, that is, a fiber diameter of carbon fibers contained in the first electrode 31 makes contributions to the contact area.

In the case where the electrode 30 (or the first electrode 31) in contact with the internal wall contains a plurality of types of fibers, it is preferable that the mean surface roughness (Ra) of the first surface 22a of the internal wall 22 is determined relative to a large fiber diameter of carbon fibers which are contained in the electrode 30 (or the first electrode 31). The large fiber diameter of the carbon fibers is set to an average diameter of diameters of ten fibers that are determined to be thick at an observation of a visual field of 500 μm square by using a scanning electron microscope (SEM).

The first electrode 31 preferably has a liquid permeability greater second electrode 32. In the case where the liquid permeability of the first electrode 31 in the in-plane direction is greater than that of the second electrode 32 in the stacking direction, the flow of the electrolyte having flown into the electrode compartment K is restricted by the second electrode 32, and the electrolyte diffuses in the in-plane direction. In the case where the electrolyte diffuses throughout recessed region 20A in the in-plane direction, charge and discharge reactions can occur on the entire surface of the electrode 30, the cell resistance decreases, and the charge and discharge capacity is improved.

The liquid outlet layer 33 is porous, and the electrolyte having flown out from the second electrode 32 is guided to the exhaust path by the liquid outlet layer 33. For this reason, the liquid outlet layer 33 preferably has a liquid permeability greater than that of the second electrode 32. In the case where the liquid permeability of the liquid outlet layer 33 in the in-plane direction is greater than that of the second electrode 32 in the stacking direction, a difference in a flow of the electrolyte in a part of the second electrode 32 in the vicinity of the exhaust path 23 becomes small. As a result, charge and discharge reactions can occur on the entire surface of the second electrode 32, and the cell resistance decreases. In the case where the liquid outlet layer 33 is made from a conductive material, and serves as an electrode (third electrode) which is a part of the electrode 30, the cell resistance further decreases. The materials provided as exemplary examples of the first electrode 31 can be used as the conductive material.

The liquid permeability can be evaluated by a Darcy's law permeability (hereinbelow, may be simply referred to as a permeability). Typically, the Darcy's law is used to represent the permeability of a porous medium, and is also applied to members other than porous materials for the sake of convenience. In a non-uniform and anisotropic member, a permeability in a direction where the lowest permeability is observed is adopted.

A Darcy's law permeability k (m²) is calculated based on a relationship with a permeation flux (m/sec) of a liquid which is represented by the following equation where when the liquid having a viscosity μ (Pa·sec) permeates through a member having a cross-sectional area S (m²) and a length L (m) at a flow rate Q (m³/sec), a pressure difference between a liquid inlet side and a liquid outlet side of the member is represented as ΔP (Pa).

$$\frac{Q}{S} = \frac{k}{\mu} \times \frac{\Delta P}{L} \qquad (1)$$

The permeability of the first electrode 31 is preferably greater than or equal to 100 times, more preferably greater than or equal to 300 times, and further more preferably greater than or equal to 1,000 times that of the second electrode 32. For a specific example where the above-described relationship can be realized, the first electrode 31 is made from a carbon felt or a carbon paper which contains carbon fibers having a fiber diameter of greater than or equal to 1 μm, and the second electrode 32 is made from a carbon-nanotube sheet which contains carbon nanotubes having a fiber diameter of less than or equal to 1 μm. The permeability of the first electrode 31 represents a permeability in the in-plane direction, and the permeability of the second electrode 32 represents a permeability in the stacking direction (normal direction of the in-plane direction).

The liquid outlet layer 33 preferably has a liquid permeability greater than that of the second electrode 32. The reason is that the electrolyte having passed through the second electrode 32 is required to be quickly exhausted to the exhaust path 23. The permeability of the liquid outlet layer 33 is preferably greater than or equal to 50 times, more preferably greater than or equal to 100 times, further more preferably greater than or equal to 300 times, and particularly preferably greater than or equal to 1,000 times that of the second electrode 32. For a specific example where the above-described relationship can be realized, the materials provided as exemplary examples of the first electrode 31 can be used as the material of the liquid outlet layer 33. The permeability of the liquid outlet layer 33 represents a permeability in the in-plane direction.

"Operation of Redox Flow Battery"

Figure 7:
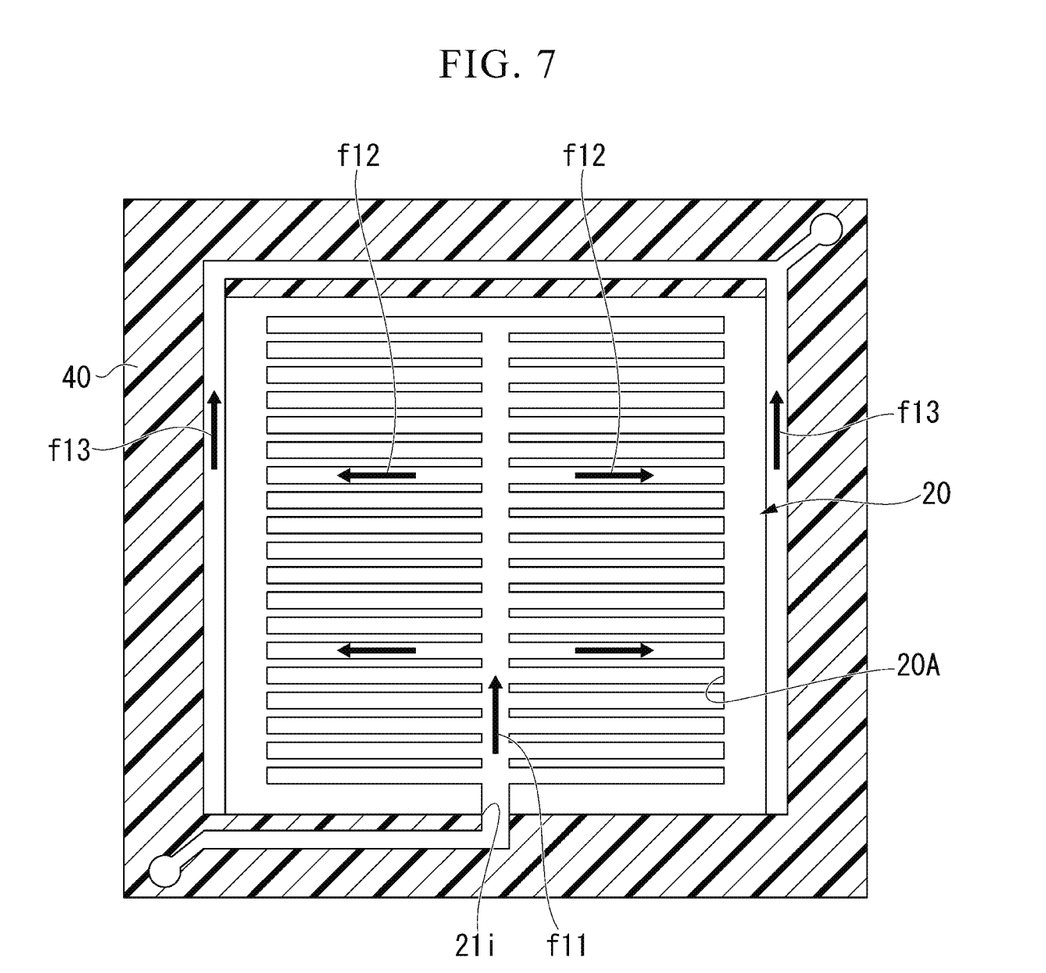
FIG. 7 is a view showing a flow of an electrolyte in the redox flow battery of the first embodiment.

An example of an operation of the redox flow battery 100 will be described with reference to FIG. 7. FIG. 7 is a view showing a flow of the electrolyte in the redox flow battery 100 of the first embodiment.

The electrolyte is supplied into the electrode compartment K of the redox flow battery 100 from an inlet port provided in the cell frame 40. The electrolyte supplied into the electrode compartment K reacts with the electrode 30 in the electrode compartment K. Ions occurring at the reactions flow between the electrodes 30 via the ion-exchange membrane 10, and charge and discharge occurs. The electrolyte after the reactions is exhausted from an outlet port provided in the cell frame 40.

The electrolyte is supplied from the opening portion 21*i* of the peripheral edge wall 21 into the recessed region 20A in the electrode compartment K (flow f11). The supplied electrolyte flows along the internal walls 22, and diffuses in the recessed region 20A in the in-plane direction (flow f12). Then the electrolyte passes through the electrode 30, and is exhausted from the exhaust path 23 (flow f13).

As described above, in the redox flow battery of the embodiment, a flow of the electrolyte is controlled, and the electrolyte can be supplied to the entire surface of the electrode in the in-plane direction. As a result, it is possible to use the entire surface of the electrode for reactions, and it is possible to decrease the cell resistance of the redox flow battery.

A preferred embodiment of the present invention has been described above in detail, and the present invention is not limited to a specific embodiment. Various modifications and changes can be made without departing from the features of the present invention described in the claims.

INDUSTRIAL APPLICABILITY

In the collector plate and the redox flow battery of the present invention, the electrolyte can diffuse to the entire surface of the electrode in the in-plane direction. Therefore, the present invention can be preferably applied to a redox flow battery of a high-capacity storage battery.

EXPLANATION OF REFERENCE SIGNS

10: ion-exchange membrane
20: collector plate
20A: recessed region
21: peripheral edge wall
21*a*: first surface of peripheral edge wall
21*i*: opening portion of peripheral edge wall
21*s*: groove
22: internal wall
22*a*: first surface of internal wall
23: exhaust path
30: electrode
31: first electrode
32: second electrode
33: liquid outlet layer
40: cell frame
100: redox flow battery
CE: single cell
K: electrode compartment
C: flow path
C1: first flow path
C2: second flow path
W1: width of peripheral edge wall
W2: width of internal wall

The invention claimed is:

1. A collector plate which is provided in a redox flow battery including: an ion-exchange membrane; the collector plates; and electrodes disposed between the ion-exchange membrane and the collector plate,
    the collector plate comprising:
    a peripheral edge wall that surrounds a predetermined region, and is provided on at least one surface of the collector plate,
    wherein a surface roughness (Ra) of a first surface which is an exposed surface of the peripheral edge wall on a side of the one surface, which is measured along a direction perpendicular to an extension direction of the peripheral edge wall, is greater than a surface roughness (Ra) of the first surface which is measured along the extension direction of the peripheral edge wall, and
    in the case where the collector plate is disposed in such a manner that the first surface faces the electrode, the peripheral edge wall forms a part of an electrode compartment through which an electrolyte flows.

2. The collector plate according to claim 1,
    wherein the surface roughness (Ra) of the first surface of the peripheral edge wall, which is measured along the direction perpendicular to the extension direction of the peripheral edge wall, is in a range of 20 μm to 500 μm.

3. The collector plate according to claim 1,
    wherein protrusions and recessions are provided in the first surface of the peripheral edge wall, and the protrusions and recessions are formed in a direction intersecting the extension direction of the peripheral edge wall.

4. The collector plate according to claim 3,
    wherein the protrusions and recessions are a plurality of grooves extending along the extension direction of the peripheral edge wall.

5. The collector plate according to claim 4,
    wherein a width of the groove is in a range of 50 μm to 500 μm.

6. The collector plate according to claim 4,
    wherein a depth of the groove is in a range of 50 μm to 500 μm.

7. A redox flow battery comprising:
    an ion-exchange membrane;
    the collector plate according to claim 1; and
    electrodes disposed between the ion-exchange membrane and the collector plate,
    wherein the collector plate is disposed in such a manner that the first surface faces the electrode, and the peripheral edge wall forms a part of an electrode compartment through which an electrolyte flows.

8. The redox flow battery according to claim 7,
    wherein a thickness of the electrode is greater than or equal to five times the surface roughness (Ra) measured along the direction perpendicular to the extension direction of the peripheral edge wall.

9. The collector plate according to claim 2,
    wherein protrusions and recessions are provided in the first surface of the peripheral edge wall, and the protrusions and recessions are formed in a direction intersecting the extension direction of the peripheral edge wall.

10. The collector plate according to claim 9,
wherein the protrusions and recessions are a plurality of grooves extending along the extension direction of the peripheral edge wall.

11. The collector plate according to claim 10,
wherein a width of the groove is in a range of 50 μm to 500 μm.

12. The collector plate according to claim 5,
wherein a depth of the groove is in a range of 50 μm to 500 μm.

13. The collector plate according to claim 10,
wherein a depth of the groove is in a range of 50 μm to 500 μm.

14. The collector plate according to claim 11,
wherein a depth of the groove is in a range of 50 μm to 500 μm.

* * * * *